(12) United States Patent
Jang et al.

(10) Patent No.: US 8,520,872 B2
(45) Date of Patent: Aug. 27, 2013

(54) APPARATUS AND METHOD FOR SOUND PROCESSING IN A VIRTUAL REALITY SYSTEM

(75) Inventors: Seock-Woo Jang, Suwon-si (KR); Sang-Ki Kang, Suwon-si (KR); Keun-Sup Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1018 days.

(21) Appl. No.: 12/541,314

(22) Filed: Aug. 14, 2009

(65) Prior Publication Data

US 2010/0040238 A1 Feb. 18, 2010

(30) Foreign Application Priority Data

Aug. 14, 2008 (KR) .................. 10-2008-0080107

(51) Int. Cl.
*H03G 3/00* (2006.01)
(52) U.S. Cl.
USPC .......................................... 381/310; 381/107
(58) Field of Classification Search
USPC ................. 381/1, 17–23, 309, 310, 104, 105, 381/107–109, 27
See application file for complete search history.

(56) References Cited

U.S. PATENT DOCUMENTS

| 7,167,567 | B1 | 1/2007 | Sibbald et al. | |
|---|---|---|---|---|
| 7,756,275 | B2 * | 7/2010 | Crundwell et al. | 381/59 |
| 2010/0260355 | A1 * | 10/2010 | Muraoka et al. | 381/107 |
| 2011/0051940 | A1 * | 3/2011 | Ishikawa et al. | 381/22 |

FOREIGN PATENT DOCUMENTS

KR 20090085326 8/2009

* cited by examiner

*Primary Examiner* — Xu Mei
(74) *Attorney, Agent, or Firm* — Stanzione & Kim, LLP

(57) ABSTRACT

An apparatus to perform sound processing in a virtual reality system includes a sound processing unit to process and produce sound output in sound areas divided into a focus area within a predetermined visual field and a non-focus area out of the predetermined visual field in a virtual reality space for sound sources; and a control unit to divide the sound areas into the focus area and the non-focus area, and to control the sound output of the sound processing unit such that a volume of sound in a first space is gradually decreased while a volume of sound in a second space is gradually increased when a space shift from the first space to the second space in the virtual reality space is detected.

46 Claims, 11 Drawing Sheets

APPARATUS AND METHOD FOR SOUND PROCESSING IN A VIRTUAL REALITY SYSTEM

CROSS-REFERENCE TO RELATED APPLICATIONS

This application claims the priority under 35 U.S.C. §119(a) of an application entitled "Apparatus And Method For Sound Processing In A Virtual Reality System" filed in the Korean Industrial Property Office on Aug. 14, 2008 and assigned Serial No. 10-2008-0080107, which is hereby incorporated by reference in its entirety.

BACKGROUND

1. Field of the Invention

The present general inventive concept relates to an apparatus and a method to perform sound processing in a virtual reality system, and more particularly to a sound processing apparatus and a sound processing method that can process sound in a focus area of a virtual reality system differently from sound in an un-focus area.

2. Description of the Related Art

The rising popularity of simulators that enable users to feel like they are experiencing an actual life in a three dimensional virtual reality has led to the development of virtual reality systems. Virtual reality systems may be used to provide a high degree of realism in an electronically-manufactured environment, such as in a virtual reality game or a 3D game.

Virtual reality systems allow users to feel various manufactured sensory inputs (including visual sense, auditory sense, and tactile sense) in a virtually formed space. The sensory inputs may replicate sensory experiences of the real world with varying degrees of realism. For example, in a virtual reality game, life-like images and sounds may be generated, but a game joystick or controller may only roughly imitate a real-life sensation of contact by vibrating. An image of a virtual reality system may be three-dimensionally realized by using a monitor, a Head Mounted Display (HMD), a television, a projector, or any other visual display device. Further, the sound of the virtual reality system may use a localization technique capable of expressing the virtual location. Sound of a virtual reality system may be generated by speakers, a headset, or any other audio device.

According to a sound processing method in the virtual reality system as described above, it is possible to make a change in the sound by modeling the path and change of sound according to relative locations of a sound-generating object, locations of surrounding things, and direction of sound propagation, to give the sense of reality to the sound. Further, to express directionality, the paths of the sound reaching listener's ears, which determine the direction of sound in view of the listener, may be modeled by using a sound processing technique, such as a Head Related Transfer Function (HRTF), so as to determine the output sound.

When a user moves in a virtual environment, the real world is imitated as much as possible. However, in some situations it may be more convenient for a user if movement in the virtual environment does not precisely mimic the real world. For example, unlike the real world in which a user cannot avoid making a continuous movement according to the passage of time, in a virtual environment, a user can shift between virtual spaces without having to portray the passage of distance or time to travel from one space to another. An example of such a virtual reality system includes a virtual reality game, "Second Life," developed by Linden Lab of the United States.

In such a virtual reality system, when a character of a user shifts between virtual spaces, the image viewed by the user and the sound heard by the user should change according to the shift between spaces or the change of the spaces. Since the spaces between which the character shifts are different from each other, the two sounds heard in the spaces are output from different sound sources. Therefore, there may be a time delay between the sound outputs during the space shift, which may degrade the sense of reality in the sound. Therefore, a sound processing technique is needed to provide a virtual reality that can give a higher sense of realism.

SUMMARY

Accordingly, the present general inventive concept solves the above-mentioned problems occurring in the prior art, and the present general inventive concept provides an apparatus and a method to perform sound processing, which can process sound of all objects in the virtual reality system to provide an improved sense of realism.

Additional aspects and utilities of the present general inventive concept will be set forth in part in the description which follows and, in part, will be obvious from the description, or may be learned by practice of the general inventive concept.

An apparatus and a method to perform sound processing may control the sound output with a sense of realism in consideration of a space shift in a virtual reality system.

An apparatus and a method to perform sound processing can minimize delay time occurring during the course of sound conversion at the time of space shift in a virtual reality system.

Features and/or utilities of the present general inventive concept may be realized by an apparatus to perform sound processing in a virtual reality system, the apparatus including a sound processing unit to process and produce sound output in sound areas divided into a focus area within a predetermined visual field and an un-focus area out of the predetermined visual field in a virtual reality space for a sound source, the sound output of the focus area being processed and produced differently than the sound output from the unfocused area. The apparatus may further include a control unit to divide the sound areas into the focus area and the un-focus area, and to control the sound output of the sound processing unit such that a volume of sound in a first space is gradually decreased while a volume of sound in a second space is gradually increased when a space shift from the first space to the second space in the virtual reality space is detected.

Other features and/or utilities of the present general inventive concept may be realized by a method to perform sound processing in a virtual reality system, the method including dividing sound areas for sound output into a focus area within a predetermined visual field and an un-focus area out of the predetermined visual field in a virtual reality space. Sound output of the focus area may be processed differently than sound output of the un-focus area. The method may further include gradually decreasing a volume of sound in a first space while gradually increasing a volume of sound in a second space when a space shift from the first space to the second space in the virtual reality space is detected.

Other features and/or utilities of the present general inventive concept may be realized by a virtual reality device including a control unit to detect a space shift in a virtual environment from a first virtual space to a second virtual space and to divide the second virtual space into a focus area and at least one non-focus area, and a sensory processing unit to generate a sensory output signal based on a control signal from the control unit. When the control unit detects a space shift, the control unit may direct the sensory processing unit to output a sensory output signal to reduce a sensory output corresponding to the first virtual space while increasing a sensory output corresponding to the second virtual space.

The sensory processing unit may be a sound processing unit and the sensory output signal may be an audio output signal.

The sound processing unit may include a focused sound processor to process sound corresponding to the focus area, a non-focused sound processor to process sound corresponding to the non-focus area, a sound volume controller to control a volume of sound corresponding to each of the focus area and the non-focus area, and a mixer to combine signals corresponding to volume-adjusted focused and non-focused audio signals and to output a single audio output signal.

The virtual reality device may further include a computer-readable medium to store sensory data corresponding to the virtual environment and to output the sensory data to the control unit.

The virtual reality device may include a communication unit to communicate with a virtual reality server to receive sensory data corresponding to the virtual environment from the virtual reality server.

The sensory processing unit may process sensory output data corresponding to the focus area differently than sensory output data corresponding to the non-focus area.

The control unit may direct the sensory processing unit to output sensory signals corresponding to the focus area with a greater magnitude relative to sensory signals corresponding to the non-focus area.

The virtual reality device may further include a sensory output unit to generate a sensory output corresponding to the sensory output signal of the sensory processing unit.

The control unit may direct the sensory processing unit to output sensory output signals corresponding to the focus area of the second virtual space before outputting sensory output signals corresponding to the non-focus area of the second virtual space.

The focus area may correspond to an area in the virtual environment adjacent to a predetermined point. The predetermined point may correspond to a character usable by a user, and the perspective of the character may be the perspective of a user. The focus area may correspond to a location in the virtual environment that is in the immediate foreground of the character visual perspective of the character. The non-focus area may include an area outside the immediate foreground of the character's visual perspective of the virtual environment.

The sensory processing unit may output sound sources corresponding to the non-focus area at a volume that is less than sound sources corresponding to the focus area.

The sensory output signals may be audio output signals, and when the control unit detects a space shift, the control unit may direct the sensory processing unit to reduce a volume of audio output signals corresponding to the first virtual space while increasing a volume of audio output signals corresponding to the second virtual space.

The control unit may direct the sensory processing unit to output audio output signals of the focus area of the second space before outputting audio output signals of the non-focus area.

Other features and/or utilities of the present general inventive concept may be realized by a method to generate a sensory output in a virtual reality system, the method including generating a first virtual space having at least a first sensory source, detecting a space shift from the first virtual space to a second virtual space having at least a second sensory source, dividing the second virtual space into a focus area and a non-focus area, and decreasing a magnitude of a sensory output of the first sensory source of the first virtual space while increasing a magnitude of a sensory output of the second sensory source of the second virtual space.

The method may further include generating a sensory output corresponding to the focus area of the second virtual space before generating a sensory output corresponding to the non-focus area of the second virtual space.

The sensory output of the second virtual space may be increased at an exponential rate, such that the sensory output corresponding to the non-focus area is increased at a faster rate than the sensory output corresponding to the focus area. Alternatively, the sensory output of the second virtual space may be output at a substantially inversely exponential rate, such that the sensory output corresponding to the focus area is increased at a faster rate than the sensory output corresponding to the non-focus area.

The first and second sensory sources may be audio sources.

The focus area may correspond to an area in the virtual environment in the immediate foreground of a visual perspective of a character corresponding to a user, and the non-focus area may correspond to an area that is not in the immediate foreground of the visual perspective of the character.

The method may further include determining whether there are a plurality of sensory sources in the focused area, and if it is determined that there are a plurality of sensory sources in the focused area, determining a priority of each of the plurality of sensory sources in the focused area and adjusting an output of each of the plurality of sensory sources in the focused area based on a respective priority.

The method may further include determining whether there are a plurality of sensory sources in the non-focused area, and, if it is determined that there are a plurality of sensory sources in the focused area, determining a priority of each of the plurality of sensory sources in the non-focused area, and adjusting an output of each of the plurality of sensory sources in the non-focused area based on a respective priority.

The method may further include mixing an output corresponding to the focused area with an output corresponding to the non-focused area to output a single sensory output integrating the outputs of the focused area and the non-focused area.

Other features and/or utilities of the present general inventive concept may be realized by a computer-readable medium having stored thereon a computer program to execute a method, the method including generating a first virtual space having at least a first sound source, detecting a space shift from the first virtual space to a second virtual space having at least a second sound source, dividing the second virtual space into a focus area and a non-focus area, and decreasing a sound volume corresponding to the first virtual space while increasing a sound volume corresponding to the second virtual space.

Other features and/or utilities of the present general inventive concept may be realized by a virtual reality system comprising a virtual reality server and a virtual reality apparatus. The virtual reality server may include a first control unit to receive data corresponding to sound sources within a virtual environment and to a character in the virtual environment, the character controllable by a user, a storage unit to store data corresponding to spaces within the virtual environment including at least a first space and a second space, and a communication unit to communicate with an external device. The virtual reality apparatus may include a communication unit to communicate with the communication unit of the virtual reality server, a sound processing unit to process and produce audio signals corresponding to the spaces in the virtual environment, and a second control unit to receive sound source data from the virtual reality server, to detect a space shift of the character in the virtual environment from the first space to the second space, and to control the sound processing unit, such that when the space shift is detected, the sound processing unit decreases a volume corresponding to the first space while increasing a volume corresponding to the second space.

When a space shift is detected, the virtual reality server may transfer to the virtual reality apparatus sound data corresponding to the focus area of the second space before transferring sound data corresponding to the non-focus area of the second space; and the second control unit may control the sound processing unit to output sound corresponding to the focus area of the second space before outputting sound corresponding to the non-focus area of the second space.

The second control unit may control the sound processing unit to output an audio signal corresponding to the non-focus area at a volume less than the focus area.

BRIEF DESCRIPTION OF THE DRAWINGS

The above and other aspects, features and advantages of the present general inventive concept will be more apparent from the following detailed description taken in conjunction with the accompanying drawings, in which.

DETAILED DESCRIPTION OF THE EMBODIMENTS

Hereinafter, exemplary embodiments of the present general inventive concept will be described with reference to the accompanying drawings. In the following description, various specific definitions found in the following description are provided only to help general understanding of the present general inventive concept, and it is apparent to those skilled in the art that the present general inventive concept can be implemented without such definitions. Further, in the following description of the present general inventive concept, a detailed description of known functions and configurations incorporated herein will be omitted when it may make the subject matter of the present general inventive concept unclear.

A virtual reality or a virtual environment may be generated by executing software code. The software code may be stored in a software-code-storing medium, such as a memory module, a server in communication with a virtual reality display device, by a CD, DVD, or any other disk, memory storage device, including a computer-readable medium. The executable code may control a virtual reality device, module, console, or entertainment or computing device. When the virtual reality device executes the code, it may be directed to control sensory devices, which may include audio, visual, tactile, olfactory, or other devices. For example, a virtual reality device may execute code that causes the virtual reality device to display a life-like image and output life-like sounds. The life-like image and sounds give a viewer and/or listener an impression of "being" in the life-like virtual location instead of their real location. For example, if the virtual reality device outputs a life-like image of a basketball court and life-like sounds of a basketball game, a viewer and/or listener may feel that they are at a basketball game rather than in their home.

Figure 1A:
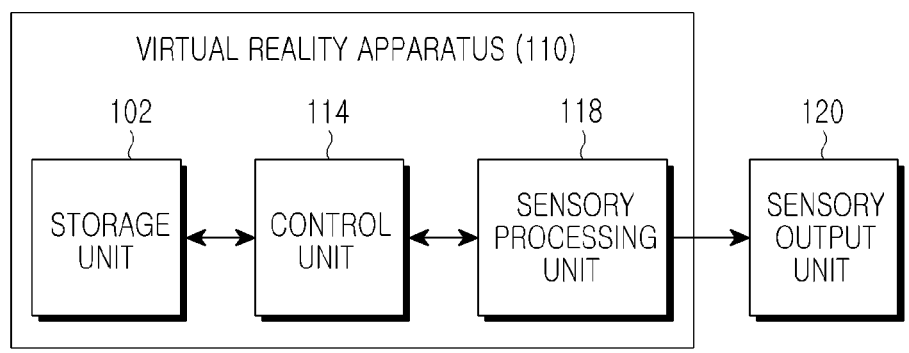
FIG. 1A is a block diagram illustrating a virtual reality apparatus according to an embodiment of the present general inventive concept.

FIG. 1A is a block diagram illustrating a virtual reality device 110 according to an embodiment of the present general inventive concept.

The virtual reality device 110 may include a control unit 114, a sensory processing unit 118, and a storage unit 102. The virtual reality device 110 may include a sensory output unit 120, or it may be connected to an external sensory output unit 120. The control unit 114 may receive input information regarding a virtual reality space. The virtual reality space may include an avatar, a character, or other object that is to provide a perspective from which the virtual environment can be sensed by a user. For example, a user may interact with the virtual environment using an avatar. The user may see, hear, and otherwise sense the virtual environment from the perspective of the avatar.

Upon receiving the virtual reality space information, the control unit 114 may access the storage unit 102 to access audio, sound, and/or other sensory data to output to the user to represent the virtual environment. According to the present embodiment, the control unit 114 may control the sensory data to correspond to the virtual environment. The control unit 114 may mix sensory data of the virtual environment including a user's avatar or character and other avatars, characters, objects, or features of the virtual environment. The control unit 114 may divide the sensory data into a focus area and non-focus areas and may control the sensory processing unit 118 to output sensory elements of the focus area differently than sensory elements of the non-focus areas. For example, the control unit 114 may instruct the sensory processing unit 118 to cause audio elements of the non-focus areas to be muffled or quieter than audio elements of a focus area. In the case of visual sensory elements, the control unit 114 may instruct the sensory processing unit 118 to cause visual elements of non-focus areas to be less clear, blurred, or dark and visual elements of the focus area to be detailed and clear.

The control unit 114 may detect whether a change of virtual space has occurred in the virtual environment, and may control the sensory processing unit 118 to correspond to the change in space. The control unit 114 may instruct the sensory processing unit 120 to fade out sensory elements of the first space and to fade in sensory elements of the second space. The control unit 114 may instruct the sensory processing unit 118 to first fade in sensory elements of a focus area of the second space and to later include sensory elements of non-focus areas of the second space.

The sensory processing unit 118 may prepare the data for output to the user via a sensory output unit 120. For example, the sensory output unit 120 may include speakers to output audible sensory data, a TV to output visual sensory data, and/or a tactile device to output tactile sensory data.

Figure 1B:
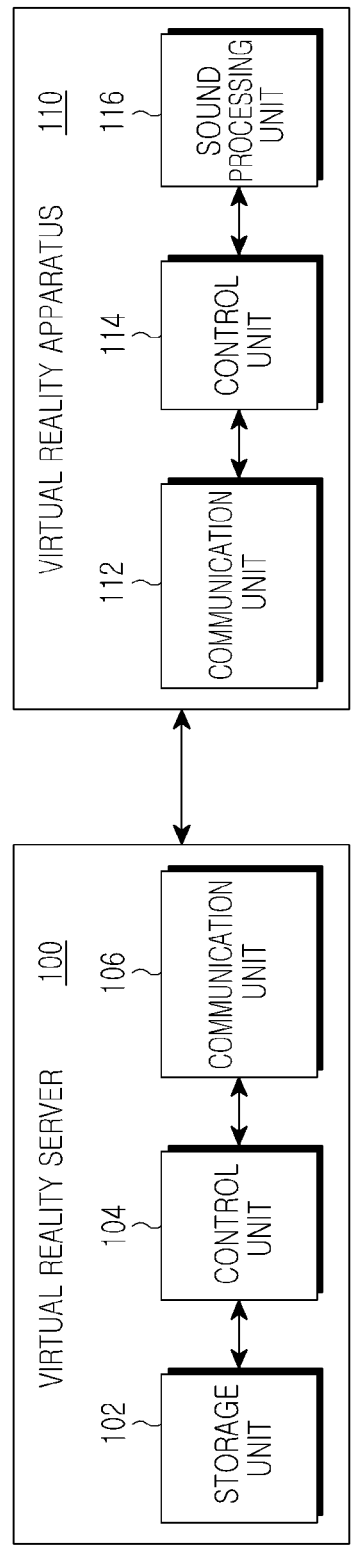
FIG. 1B is a block diagram illustrating a virtual reality system according to an embodiment of the present general inventive concept.

FIG. 1B is a block diagram illustrating a virtual reality system according to an embodiment of the present general inventive concept.

The virtual reality system according to the embodiment shown in FIG. 1B may include a virtual reality server 100 and a virtual reality apparatus 110.

The virtual reality server 100 may include a control unit 104, a storage unit 102, and a communication unit 106 to provide predetermined virtual reality environments, such as a virtual reality game, and various sound sources provided in the virtual reality environments to the virtual reality apparatus 110 of the user. In FIG. 1B, the control unit 104 controls the general operation of the virtual reality server 100 and provides sound sources as well as image sources occurring in the virtual reality environments to the virtual reality apparatus 110.

The control unit 104 may receive an input of a selected virtual reality character from the user to which the virtual reality environment is provided, check sound source information on other characters and other objects existing in the virtual reality spaces already stored in the storage unit 102, and provides the virtual reality apparatus 110 with sound sources occurring in real time according to the relative locations or situations of the character in the virtual reality environment. In FIG. 1B, the communication unit 106 transfers the sound sources delivered through the control unit 104 to the virtual reality apparatus 110 according to a predetermined communication scheme. The communication unit 106 may use various wire and wireless communication schemes applicable to the virtual reality system.

The virtual reality apparatus 110 may be a terminal apparatus of the user using the virtual reality service and may include a communication unit 112, a control unit 114, and a sound processing unit 116. The control unit 114 of the virtual reality apparatus 110 analyzes the received sound sources and mixes the sound of the user's character and the sound of other characters existing around the user in the virtual reality space by controlling the volumes and left-right balance of the sounds according to the sound areas divided according to the present embodiment. That is, the control unit 114 may divide the virtual reality space into multiple sound areas and control the volumes and left-right balance of the sounds occurring in the divided sound areas. In particular, in dividing the virtual reality space into the sound areas, the sound processing unit 116 divides, under the control of the control unit 114, the sound areas of the virtual reality space into a focus area and non-focus areas, and identifies sound generated in the focus area within a visual field of the character selected by the user, so as to identify the exact sound-generating location in the focus area. The user may use a Head Related Transfer Function (HRTF) as an algorithm for identifying the sound-generating location. Further, under the control of the control unit 114, the sound processing unit 116 identifies sound occurring in an un-focus area of the character in the virtual reality space and controls the volume and left-right balance of the identified sound.

The control unit 114 may further detect virtual space shift of the character and control the operation of the sound processing unit 116 so as to cause the sound processing unit 116 to, for example, gradually decrease the volume of the sound of a first space while gradually increasing the volume of the sound of a second space when the character shifts from the first space to the second space. The control unit 114 controls the sound output of the second space in such a manner that the sound of the focus area of the second space is output before the sound of the non-focus area of the second area. Further, the communication unit 112 receives the sound sources of the virtual reality environment transferred from the virtual reality server 100 according to a predetermined communication scheme. The communication unit 112 may be optionally employed depending upon whether the virtual reality server 100 is used. Although the virtual reality server 100 and the virtual reality apparatus 110 are separated in FIG. 1B, they can be incorporated within one apparatus.

Hereinafter, the focus area and the non-focus area will be described in more detail with reference to FIG. 2.

Figure 2:
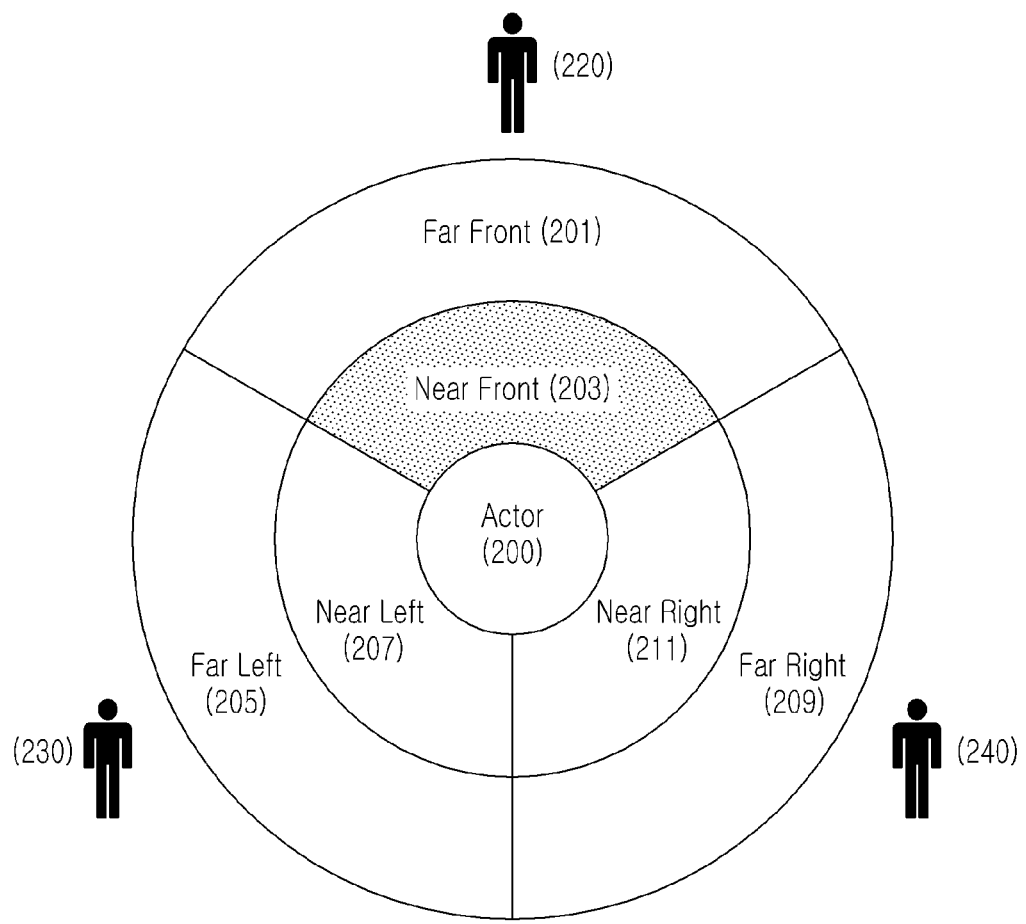
FIG. 2 illustrates a method of dividing sound areas of a virtual reality space in a virtual reality apparatus according to an embodiment of the present general inventive concept.

FIG. 2 illustrates a method of dividing sound areas of a virtual reality space in a virtual reality apparatus according to an embodiment of the present general inventive concept.

FIG. 2 is based on a situation in which a character, or actor, 200 of the user of the virtual reality apparatus looks at a first companion 220 while a second companion 230 and a third companion 240 look at the character 200.

In this situation, the virtual reality apparatus may divide the virtual reality space into a focus area within the visual field of the character using the virtual reality apparatus and non-focus areas outside the visual field of the character. The focus area within the visual field of the character refers to an area 203 (shaded portion) adjacent to the character 200 in the front space within the visual field of the character 200. The non-focus areas beyond the visual field of the character include an area 201 relatively distanced far from the character 200 in the front space within the visual field of the character 200 and areas 205, 207, 209, and 211 located outside the visual field of the character 200. The division between the focus area and the non-focus areas in FIG. 2 is only an example and may be modified in various ways according to the characteristics and/or topography of the virtual area at which the character is located in the virtual reality space. For example, while the dividing of sound areas is described with respect to a character 200 and companions 220, 230, and 240, the "companions" need not be players or personages. Rather, each divided focus or non-focus area may contain any number of virtual objects represented by sensory data that may include audio and visual data, for example. Further, at least one of the focus area and the non-focus areas may be divided into multiple areas in the virtual reality space according to a predetermined priority in controlling the volume of the sound or the left-right balance.

Figure 3:
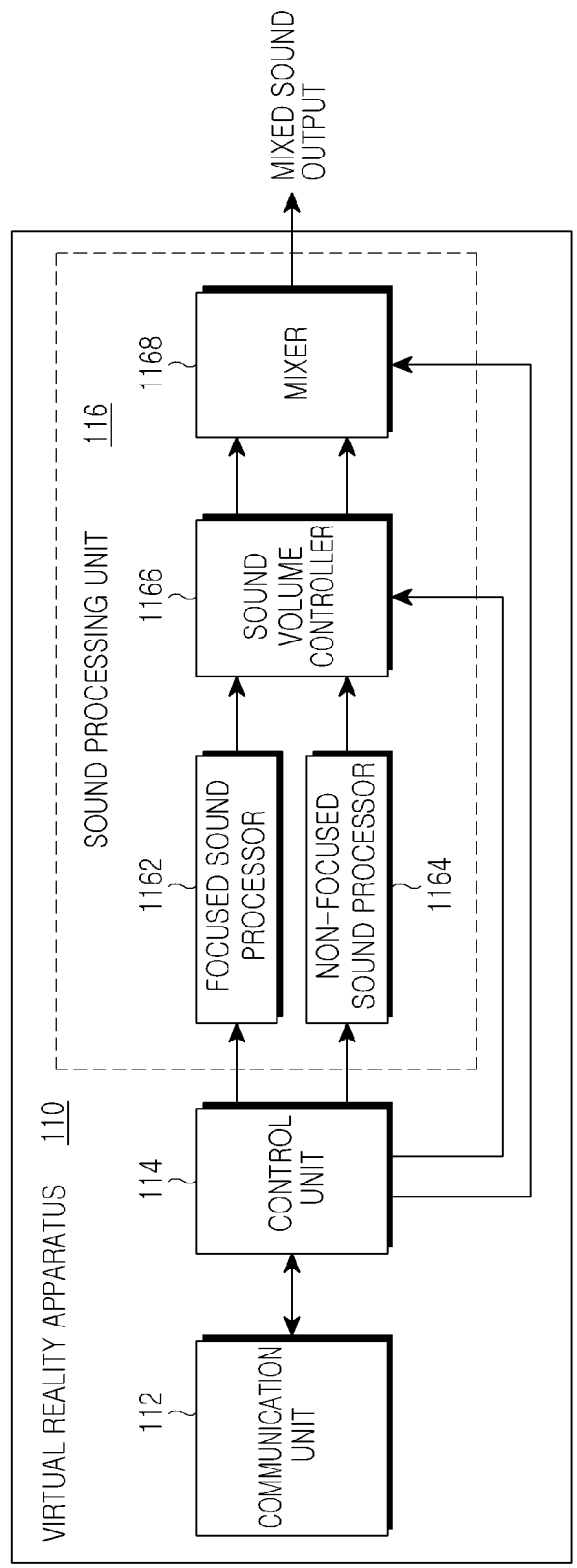
FIG. 3 is a block diagram illustrating the virtual reality apparatus in the virtual reality system of FIG. 1B.

FIG. 3 is a block diagram illustrating the construction of the virtual reality apparatus 110 in the virtual reality system of FIG. 1B and illustrates the sound processing unit 116 in more detail.

Referring to FIG. 3, the sound processing unit 116 includes a focused sound processor 1162 to process sound of a focus area, a non-focused sound processor 1164 to process sound of a non-focus area, a sound volume controller 1166, and a mixer 1168.

First, under the control of the control unit 114, the focused sound processor 1162 identifies the sound (focused sound) occurring in the focus area according to the division of the virtual reality space described above with reference to FIG. 2, i.e. the focus area within the visual field of the character selected by the user of the virtual reality space, and controls the volume and left-right balance of the focused sound. Further, under the control of the control unit 114, the non-focused sound processor 1164 identifies an exact location of sound (non-focused sound) occurring in the non-focus area and controls the volume and left-right balance of the non-focused sound.

Meanwhile, in the case of virtual space shift, for example, when the virtual reality space shifts from a first space to a second space, the sound volume controller 1166 gradually decreases the volume of the sound of the first space, which is the space before the shift, and gradually increases the volume of the sound of the second space, which is the space after the shift, in proportion to the sound decrease in the first space under the control of the control unit 114. The shift from the first space to the second space may occur in various ways, for example, when the control unit 114 detects a key input of the user for character movement through a key input unit (not shown) of the virtual reality apparatus 110 or when the control unit 114 detects scene change due to space shift in a video output (not shown).

Under the control of the control unit 114, the mixer 1168 mixes sound data output from the sound volume controller 1166 and outputs the mixed sound.

In the mixing of the sound, the control unit 114 controls the volume and left-right balance of the sound of the other characters existing around the character selected by the user according to the sound areas of the virtual reality space. Specifically, the control unit 114 divides the virtual reality space into multiple areas and controls the volume and left-right balance of the sound occurring in the divided areas, and controls the volume of the sound of the first area and the second area.

Hereinafter, a sound processing process for providing virtual reality sound by the virtual reality apparatus 110 will be described in detail with reference to FIG. 4.

Figure 4:
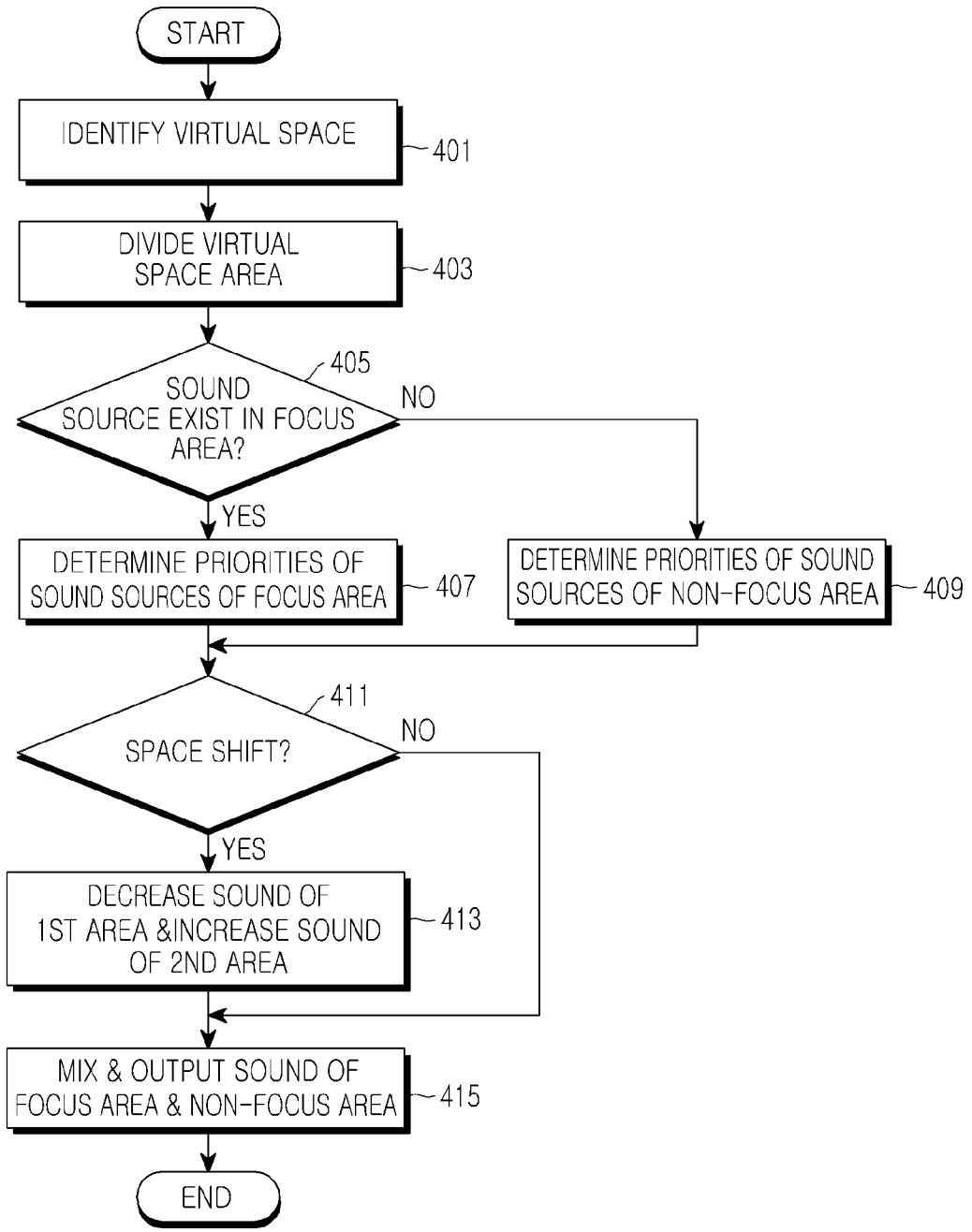
FIG. 4 is a flow diagram illustrating a sound processing process for providing virtual reality sound according to an embodiment of the present general inventive concept.

FIG. 4 is a flow diagram illustrating a sound processing process to provide virtual reality sound according to an embodiment of the present general inventive concept. In particular, FIG. 4 illustrates an operation of the virtual reality apparatus 110 when space shift is detected during output of sound.

First, it is assumed that a sound source within the virtual reality environment is provided to the control unit 114, by the virtual reality server 100, for example. However, this is only an example and such a sound source may be generated within the virtual reality apparatus 110. In operation 401 of FIG. 4, the control unit 114 identifies a virtual space provided by the virtual reality server 100. Then, in operation 403, the control unit 114 divides the sound area of the virtual space into a focus area and non-focus areas. In operations 401 and 403, the identification of the virtual space and division of the sound area of the virtual space are performed according to a predetermined scheme. Thereafter, in operation 405, the control unit 114 determines if there is any sound occurring in the focus area. When it is determined that there is sound occurring in the focus area, the control unit 114 determines priorities of sound sources of the sound occurring in the focus area in operation of 407. Since the method of FIG. 4 is implemented only when a sound source of the virtual environment is provided to the control unit 114, if the sound source is not within the focus area, it must be in a non-focus area. The control unit 114 determines priorities of sound sources of the sound occurring in the non-focus area in operation 409.

Further, although not shown in FIG. 4, when there is occurrence of sound in both the focus area and the non-focus area, the control unit 114 may determine priorities of sound sources for at least one of the focus area and the non-focus area.

In operation 411, the control unit 114 determines if there is a space shift of the character of the user. When a space shift of the character of the user is detected, the sound volume controller 1166 decreases the volume of the sound of the first space while increasing the volume of the sound of the second space according to predetermined sound priorities of the second space under the control of the control unit 114 in step 413. Then, in operation 415, the sound of the first space and the sound of the second space output from the sound volume controller 1166 are mixed and output by the mixer 1168. In the meantime, when space shift is not detected in operation 411, operation 415 is performed without operation 413. Although not shown in FIG. 4, when there is space shift of the user's character during the sound output of operation 415, the control unit 114 detects the space shift and then performs the operation 415 after operation 413.

In a virtual reality system, etc. according to the present general inventive concept as described above, it is possible to control the volume and left-right balance of sound according to the location of an object generating the sound and control the output of the sound by dividing the output sound into focused sound and non-focused sound, so as to portray the sound change of each object without degrading the sense of reality even in the virtual reality world having a large number of sound objects.

Hereinafter, an example of an implementation of an embodiment of the present general inventive concept will be described in detail with reference to FIG. 5, by providing a virtual space shift from a basketball court to a conference room.

Figure 5:
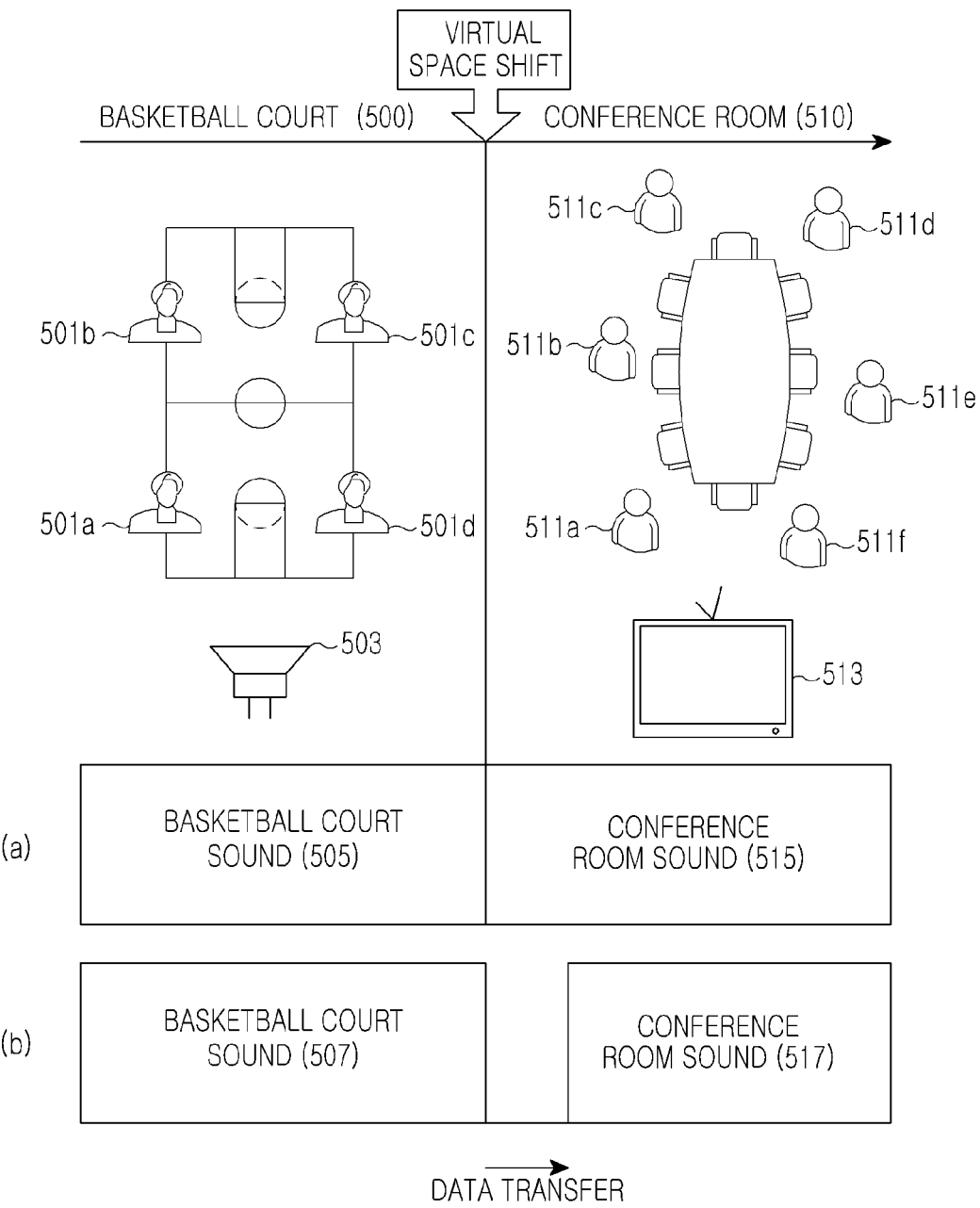
FIG. 5 illustrates an example of a conventional sound processing process for providing virtual reality sound in a virtual reality apparatus.

FIG. 5 illustrates an example of a sound processing process for providing virtual reality sound in a conventional virtual reality apparatus.

FIG. 5 is based on an assumption of space shift from a basket ball court 500 to a conference room 510. In other words, the perspective of a user's avatar or character in the virtual environment changes from a first space (basketball court 500) to a second space (conference room 510).

Ideally, basket ball court sound 515 including sound of people 501a to 501d and sound of a speaker 503 in the basket ball court 500 is first provided as shown in (a) of FIG. 5 and should be instantly converted to conference room sound 515 including sound of people 511a to 511f and sound of a television 513 in the conference room 510 as soon as the virtual space shift from the first space to the second space is detected.

However, as shown in (b) of FIG. 5, in actuality there is a delay between a time that a space shift occurs and a time that the sound begins in the new space. This delay may be due to data transfer speeds of the sound in the new space, for example To provide the conference room sound 517, it is necessary to receive the conference room sound 517 for all objects, which causes a predetermined time delay. Further, the more sound sources that exist in the new space, the longer the delay due to the transmission time. Therefore, the more the sound sources, the lower the quality of the service, and the less realistic the new space feels to a user.

Figure 6:
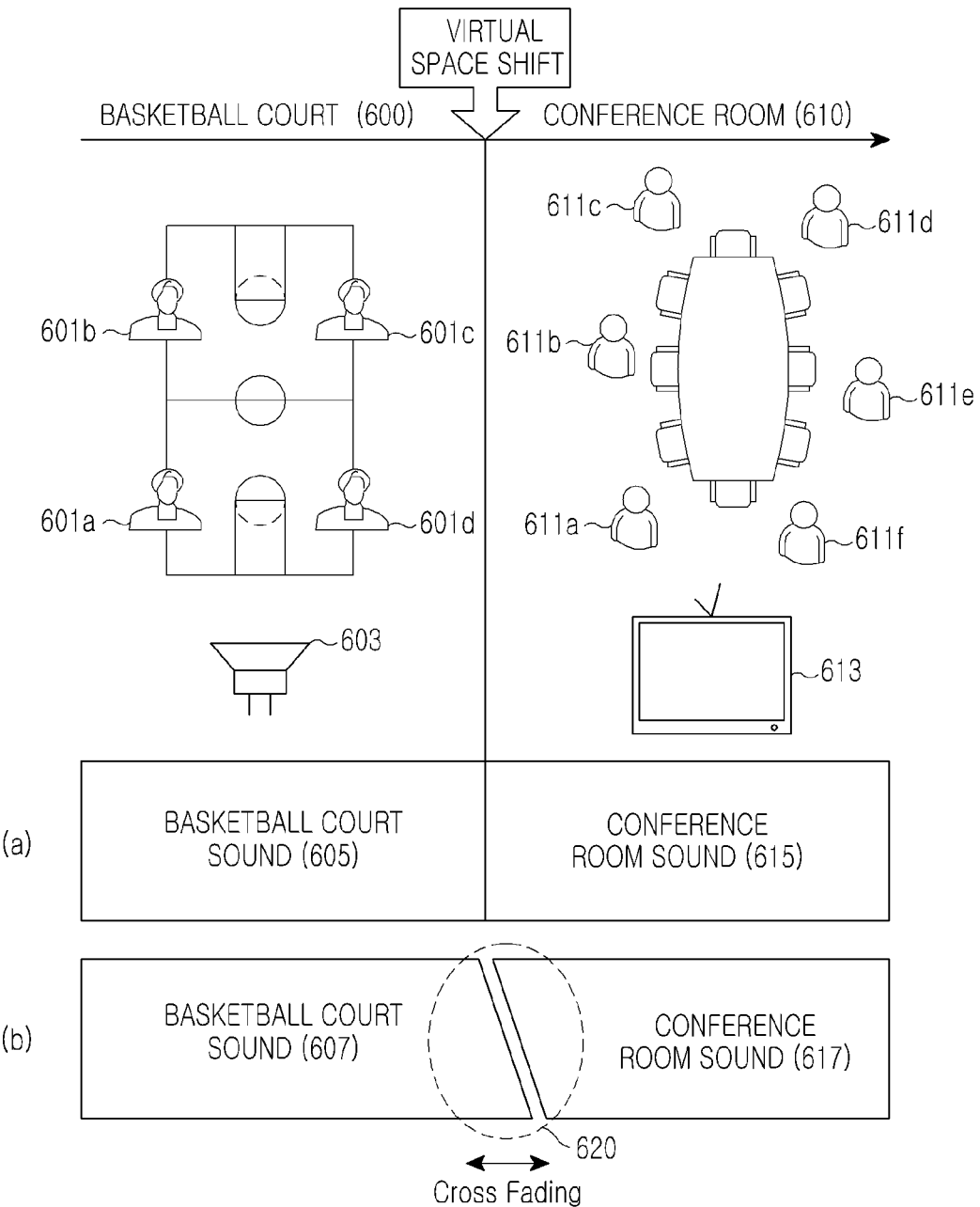
FIG. 6 illustrates a sound mixing process to provide virtual reality sound by a virtual reality apparatus according to an embodiment of the present general inventive concept.

In consideration of this point, the present general inventive concept provides a sound mixing process to provide a virtual reality sound, as shown in FIG. 6.

FIG. 6 illustrates a space shift in a virtual environment from a basket ball court 600 to a conference room 610.

Ideally, basket ball court sound 605 including sound of people 601a to 601d and sound of a speaker 605 in the basket ball court 600 is first provided as shown in (a) of FIG. 6 and should be instantly converted to conference room sound 610 including sound of people 611a to 611f and sound of a television 613 in the conference room 610 as soon as the virtual space shift from the first space to the second space is detected.

However, as discussed above, a delay may occur between when a space shift is detected and when the sound of the second space is received. According to an embodiment of the present general inventive concept, to minimize the time delay occurring during the space shift from the basket ball court 600 to the conference room 610, priorities of the sound sources of a focus area and non-focus areas of the conference room 610 are first determined. Then, as shown in (b) of FIG. 6, the volume of the basket ball court sound 607 is decreased or faded while the volume of the conference room sound 617 generated according to the priorities of the focus area or non-focus areas of the conference room 610 is increased. This sound volume control method can be expressed by the portion designated by reference numeral 620 of FIG. 6. The sound conversion process during the virtual space shift will be described with reference to FIG. 7.

Figure 7:
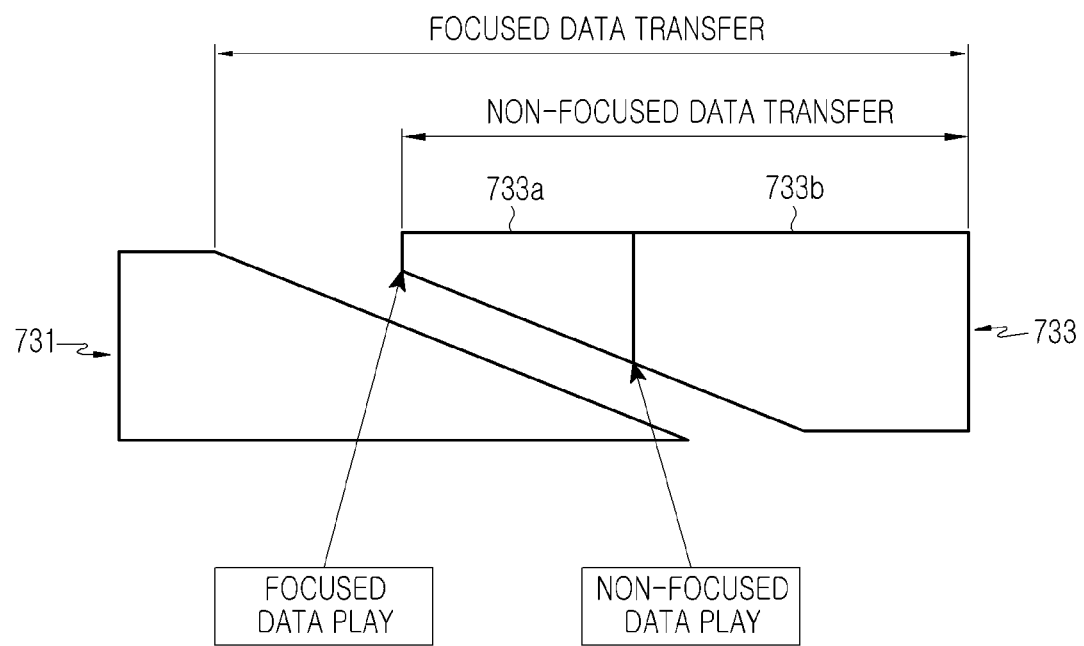
FIG. 7 illustrates a sound conversion process at the time of virtual space shift in a virtual reality apparatus according to an embodiment of the present

FIG. 7 illustrates a sound conversion process at the time of virtual space shift in a virtual reality apparatus according to an embodiment of the present general inventive concept. A height of the elements 731 and 733 represents a magnitude of a sound signal, such as a volume of a sound source. Thus, when element 731 has a greater height, it has a louder volume.

First, if a space shift is detected, sound 731 of the first space in which the current character exists is gradually decreased. Then, sound 733 of the second space, which is the target of the shift, is divided into the focus area and the non-focus area, priorities are given to sound sources of the sound 733*a* occurring in the focus area, and the sound 733*a* is output while gradually increasing the volume of the sound 733*a* according to the given priorities. Thereafter, around the time point at which the output of the sound of the first space is completed, priorities are given to sound sources of the sound occurring in the non-focus area, and the sound 733*b* mixing the sound 733*a* and the sound occurring in the non-focus area is output while gradually increasing the volume of the sound 733*b* and the sound 733*b* according to the given priorities.

According to the present general inventive concept using the method as described above, it is possible to minimize the time delay occurring during the sound processing at the time of virtual space shift in a virtual reality system.

Figure 8A:
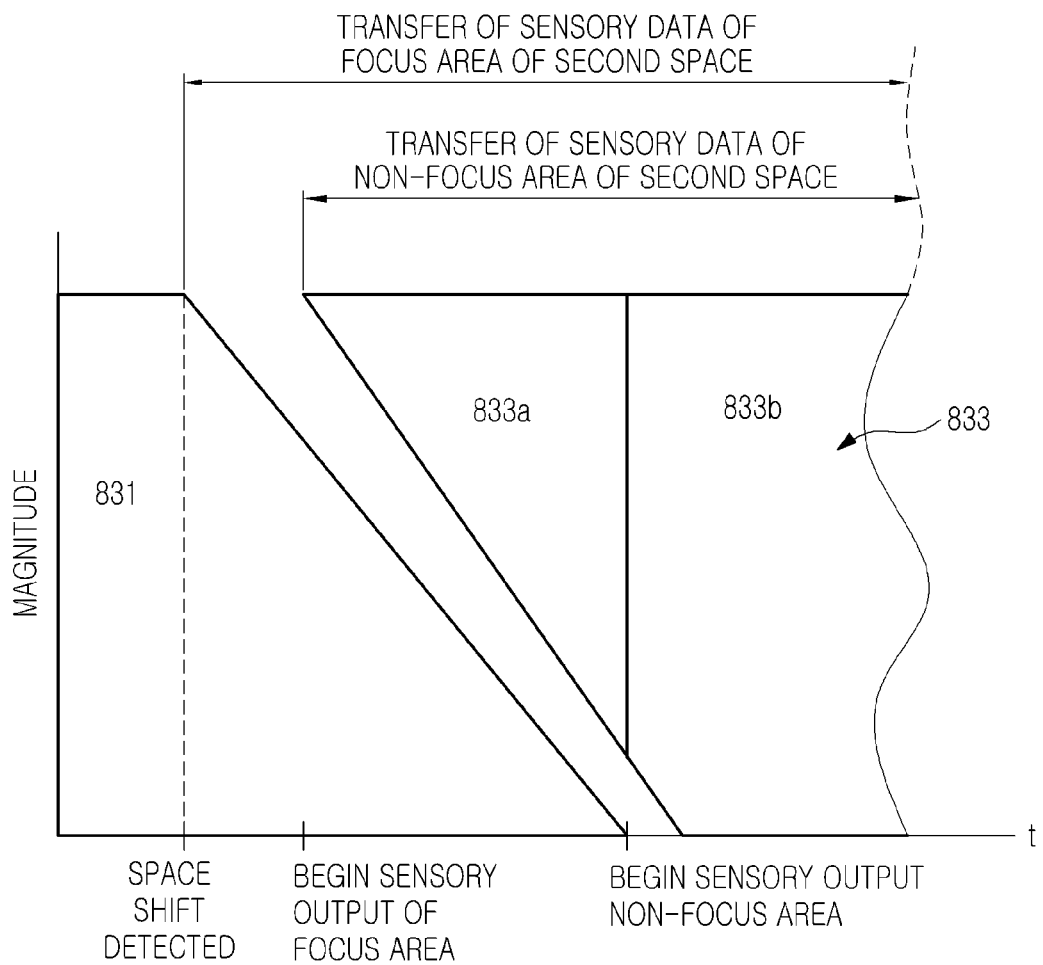
FIGS. 8A-8C illustrate sound conversion processes of a virtual space shift according to the present general inventive concept.
Figure 8B:
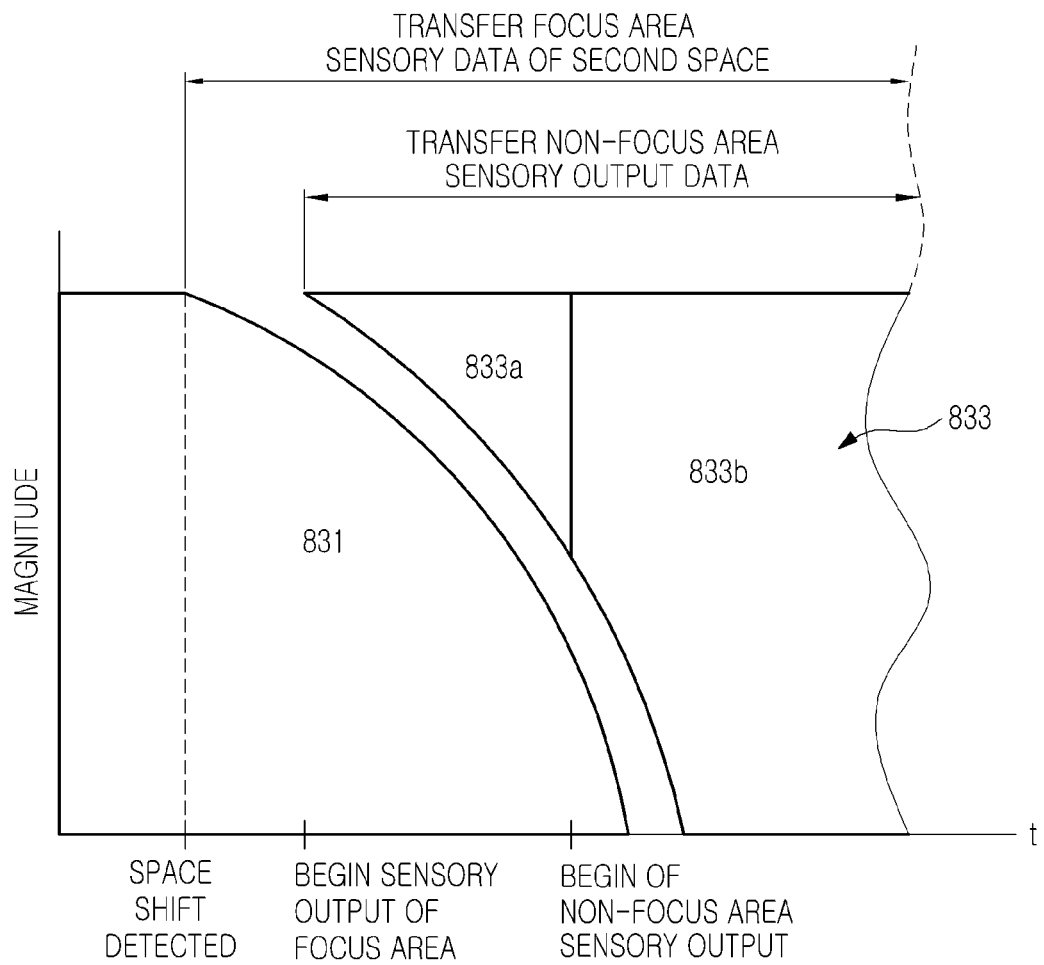
Figure 8C:
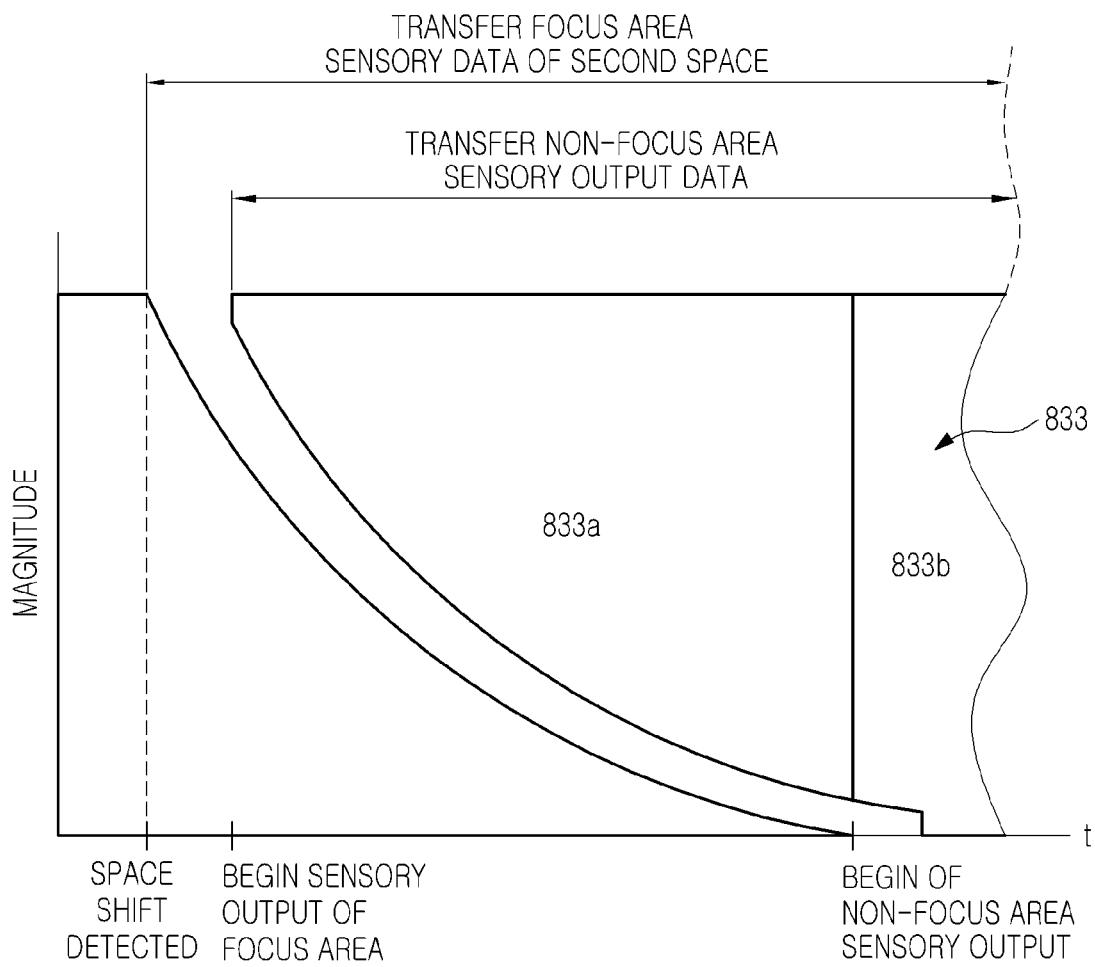

While embodiments above have been described in terms of an audio feature of a virtual reality device, the general inventive concept may be applied to any sensory output. FIGS. 8A-8C illustrate a process of fading out a sensory output of a first space and fading in a sensory output of a second space when a space shift is detected in a virtual environment.

In FIG. 8A, a magnitude of a sensory output 831 of a first space may be at 100% until a space shift is detected. A virtual space may include any objects or characters represented via a sensory output to a user to give the user a sense of being in a virtual environment. The user experiences the virtual environment from a certain perspective corresponding to an avatar, character, or object. A space shift occurs, for example, if the user's character moves suddenly within the virtual environment from a first virtual space to a second virtual space. Once a space shift is detected, the magnitude of the sensory output of the first space in the space shift, or the space from which the character is moving, begins to decrease. In addition, data corresponding to sensory outputs 833 of the second space, or the space to which the character is moving, begin to be transferred to a virtual reality device, or a portion of the virtual reality device, to prepare to be output with a sensory output device.

For example, if a user's character moves from a basketball court to a conference room, visual, audio, or tactile elements of the basketball court may decrease in magnitude, and visual, audio, or tactile elements of the conference room may begin to be transferred to a virtual reality device or a portion of the virtual reality device. Transferring the sensory output data of the second space may include transferring data from a source outside the virtual reality device or from a storage unit within the virtual reality device to a control unit.

When transferring the sensory output data of the second space, the sensory output data is first divided into a focus area and non-focus areas, as described above. Upon being transferred, the sensory data corresponding to the focus area of the second space is output as sensory output 833. Meanwhile, the sensory data corresponding to the non-focus area or areas of the second space may begin to be transferred. Once sufficient sensory data corresponding to the non-focus area or areas has been transferred, the sensory non-focus area sensory data may be mixed with the focus area sensory data and output as sensory output 833.

While the FIG. 8A shows the transfer of focus area sensory data as beginning at the space shift detection point the data transfer may, in fact, begin at any point after the detection point. In addition, while FIG. 8A shows that the first space sensory output 831 ends when the sensory output corresponding to the non-focus areas of the second space begins, the first space sensory output 831 may end at any predetermined point before or after the sensory output corresponding to the non-focus areas of the second space begins.

FIGS. 8B and 8C illustrate variations of a sensory output fading according to an embodiment of the present general inventive concept. As shown in FIG. 8B, the fading out of the first space sensory output 831 and the fading in of the second space sensory output 833 may have a curved shape, so that the increase in non-focus sensory output 833*b* occurs at a faster rate than the increase of the focus area sensory output 833*a*. The curve may have a logarithmic shape or other exponentially-changing shape, for example. Such a process may be used to create a "fade-out" sensation close to the point of space change then to rapidly complete the space change. Alternatively, such a process may be used when few sensory output producing objects or characters are detected in the non-focus areas relative to the focus area. For example, if many sensory output producing objects are located in the focus area, but few are located in non-focus areas, the focus area sensory output 833*a* may begin at a relatively gradual rate and the non-focus area sensory output 833*b* my occur at a more rapid rate.

FIG. 8C illustrates a fading-out of the first space sensory output 831 and the fading in of the second space sensory output 833 that begins at a faster rate and tapers off to a slower rate. Such a process may be used to depict a slow transition from the first space to the second space. Alternatively, such a process may be used when a large number of sensory output producing objects or characters are detected in the non-focus areas relative to the focus area. In such a case, the transition from the first space to the second case may be made smoother by rapidly outputting the sensory output 833*a* of the focus area of the second space and then gradually increasing the output 833*b* of the non-focus areas of the second space.

The present general inventive concept may also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium may include a network including network servers or other computers to transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been shown and described with reference to certain exemplary embodiments thereof, it will be understood by those skilled in the art that various changes in form and details may be made therein without departing from the spirit and scope of the general inventive concept as defined by the appended claims.

What is claimed is:

1. An apparatus to perform sound processing in a virtual reality system, the apparatus comprising:
   a sound processing unit to process and produce sound output corresponding to virtual spaces of a virtual reality environment, the virtual spaces divided into a focus area and a non-focus area, the sound output of the focus area being processed and produced differently than the sound output of the non-focus area; and
   a control unit to divide the virtual spaces of the virtual reality environment into the focus area and the non-focus area, and to control the sound output of the sound processing unit such that when a space shift from a first virtual space in the virtual reality environment to a second virtual space in the virtual reality environment is detected, a volume of sound corresponding to the first virtual space is gradually decreased while a volume of sound corresponding to the second virtual space is gradually increased.

2. The apparatus of claim 1, wherein the control unit controls the sound processing unit such that sound corresponding to the focus area in the second virtual space is output before the sound corresponding to the non-focus area in the second virtual space, and the sound of the focus area and the sound of the non-focus area are output together after passage of predetermined time after the space shift is detected.

3. The apparatus of claim 1, wherein the sound processing unit comprises a sound volume controller to control the volume of sound in the first virtual space and the volume of sound in the second virtual space, such that the volume of sound in the first virtual space is different than the volume of sound in the second virtual space.

4. The apparatus of claim 1, wherein the control unit divides the focus area into multiple sub-areas, each given a predetermined priority and controls sound output of a first sound source output in the focus area from among a plurality of sound sources in the focus area according to the predetermined priorities.

5. The apparatus of claim 1, wherein the control unit divides the non-focus area into multiple sub-areas, each having a predetermined priority, and controls sound output of a first sound source output in the non-focus area from among a plurality of sound sources according to the predetermined priorities.

6. The apparatus of claim 1, further comprising a communication unit to communicate with a server of the virtual reality system according to a predetermined communication scheme, wherein the sound sources are received through the communication unit from the server.

7. The apparatus of claim 1, wherein the control unit detects the space shift by identifying a key input for the space shift of a user character in the virtual reality space.

8. A method to perform sound processing in a virtual reality system, the method comprising:
   dividing virtual spaces of a virtual reality environment into a focus area and a non-focus area with a control unit of the virtual reality system;
   processing the sound output of the focus area differently than the sound output of the non-focus area with a sound processing unit of the virtual reality system; and
   when a space shift from a first virtual space in the virtual reality environment to a second virtual space in the virtual reality environment is detected, gradually decreasing a volume of sound in the first virtual space while gradually increasing a volume of sound in the second virtual space with the control unit of the virtual reality system.

9. The method of claim 8, further comprising:
   outputting the sound of the focus area before the sound of the non-focus area by controlling the sound processing unit with the control unit; and
   outputting sound of the focus area and sound of the non-focus area together after passage of predetermined time by controlling the sound processing unit with the control unit.

10. The method of claim 8, further comprising dividing the focus area into multiple sub-areas with the control unit, each having a predetermined priority, and controlling sound output of a first sound source output in the focus area from among a plurality of sound sources in the focus area according to the predetermined priorities with the control unit.

11. The method of claim 8, further comprising dividing the non-focus area with the control unit into multiple sub-areas, each having a predetermined priority, and controlling sound output of a first sound source output in the non-focus area from among a plurality of sound sources according to the predetermined priorities with the control unit.

12. The method of claim 8, further comprising detecting the space shift with the controller by identifying a key input for the space shift of a user character in the virtual reality space.

13. A virtual reality device, comprising:
   a control unit to detect a space shift in a virtual environment from a first virtual space to a second virtual space and to divide the second virtual space into a focus area and at least one non-focus area; and
   a sensory processing unit to generate a sensory output signal based on a control signal from the control unit,
   wherein when the control unit detects a space shift, the control unit directs the sensory processing unit to output a sensory output signal to reduce a sensory output corresponding to the first virtual space while increasing a sensory output corresponding to the second virtual space.

14. The virtual reality device according to claim 13, wherein the sensory processing unit is a sound processing unit and the sensory output signal is an audio output signal.

15. The virtual reality device according to claim 14, wherein the sound processing unit comprises:
   a focused sound processor to process sound corresponding to the focus area;
   a non-focused sound processor to process sound corresponding to the non-focus area;
   a sound volume controller to control a volume of sound corresponding to each of the focus area and the non-focus area; and a mixer to combine signals corresponding to volume-adjusted focused and non-focused audio signals and to output a single audio output signal.

16. The virtual reality device according to claim 13, further comprising a computer-readable medium to store sensory data corresponding to the virtual environment and to output the sensory data to the control unit.

17. The virtual reality device according to claim 13, further comprising a communication unit to communicate with a virtual reality server to receive sensory data corresponding to the virtual environment from the virtual reality server.

18. The virtual reality device according to claim 13, wherein the sensory processing unit processes sensory output data corresponding to the focus area differently than sensory output data corresponding to the non-focus area.

19. The virtual reality device according to claim 18, wherein the control unit directs the sensory processing unit to output sensory signals corresponding to the focus area with a greater magnitude relative to sensory signals corresponding to the non-focus area.

20. The virtual reality device according to claim 13, wherein the control unit directs the sensory processing unit to output sensory output signals corresponding to the focus area of the second virtual space before outputting sensory output signals corresponding to the non-focus area of the second virtual space.

21. The virtual reality device according to claim 13, further comprising a sensory output unit to generate a sensory output corresponding to the sensory output signal of the sensory processing unit.

22. The virtual reality device according to claim 13, wherein the focus area corresponds to an area in the virtual environment adjacent to a predetermined point.

23. The virtual reality device according to claim 22, wherein the predetermined point corresponds to a character usable by a user, and
the perspective of the character of the virtual environment is the perspective of the user.

24. The virtual reality device according to claim 23, wherein the focus area corresponds to a location in the virtual environment that is in the immediate foreground of the character's visual perspective.

25. The virtual reality device according to claim 24, wherein the non-focus area comprises an area outside the immediate foreground of the character's visual perspective of the virtual environment.

26. The virtual reality device according to claim 25, wherein the sensory processing unit outputs sound sources corresponding to the non-focus area at a volume that is less than sound sources corresponding to the focus area.

27. The virtual reality device according to claim 25, wherein the sensory output signals are audio output signals, and
when the control unit detects a space shift, the control unit directs the sensory processing unit to reduce a volume of audio output signals corresponding to the first virtual space while increasing a volume of audio output signals corresponding to the second virtual space.

28. The virtual reality device according to claim 27, wherein the control unit directs the sensory processing unit to output audio output signals of the focus area of the second space before outputting audio output signals of the non-focus area.

29. A method to generate a sensory output in a virtual reality system, the method comprising:
generating a first virtual space having at least a first sensory source with a sensory processing unit of the virtual reality system;
detecting a space shift from the first virtual space to a second virtual space having at least a second sensory source with a control unit of the virtual reality system;
dividing the second virtual space into a focus area and a non-focus area with the control unit; and
decreasing a magnitude of a sensory output of the first sensory source of the first virtual space while increasing a magnitude of a sensory output of the second sensory source of the second virtual space with the control unit.

30. The method according to claim 29, further comprising generating a sensory output with the sensory processing unit corresponding to the focus area of the second virtual space before generating a sensory output corresponding to the non-focus area of the second virtual space.

31. The method according to claim 30, wherein the sensory output of the second virtual space is increased at an exponential rate with the control unit, such that the sensory output corresponding to the non-focus area is increased at a faster rate than the sensory output corresponding to the focus area.

32. The method according to claim 30, wherein the sensory output of the second virtual space is output at a substantially inverse rate with the control unit, such that the sensory output corresponding to the focus area is increased at a faster rate than the sensory output corresponding to the non-focus area.

33. The method according to claim 29, wherein the first and second sensory sources are audio sources.

34. The method according to claim 29, further comprising determining whether there are a plurality of sensory sources in the focused area with the control unit;
if it is determined that there are a plurality of sensory sources in the focused area, determining a priority of each of the plurality of sensory sources in the focused area with the control unit; and
adjusting an output of each of the plurality of sensory sources in the focused area based on a respective priority with the control unit.

35. The method according to claim 34, further comprising:
determining whether there are a plurality of sensory sources in the non-focused area with the control unit;
if it is determined that there are a plurality of sensory sources in the non-focused area, determining a priority of each of the plurality of sensory sources in the non-focused area with the control unit; and
adjusting an output of each of the plurality of sensory sources in the non-focused area based on a respective priority with the control unit.

36. The method according to claim 29, further comprising mixing an output corresponding to the focused area with an output corresponding to the non-focused area to output a single sensory output integrating the outputs of the focused area and the non-focused area with the control unit.

37. The method according to claim 29, wherein the focus area corresponds to an area in the virtual environment in the immediate foreground of a visual perspective of a character corresponding to a user, and
the non-focus area corresponds to an area that is not in the immediate foreground of the visual perspective of the character.

38. A non-transitory computer-readable medium having stored thereon a computer program to execute a method, the method comprising:
generating a first virtual space having at least a first sound source with a sensory processing unit of the virtual reality system;

detecting a space shift from the first virtual space to a second virtual space having at least a second sound source with a control unit of the virtual reality system;

dividing the second virtual space into a focus area and a non-focus area with the control unit; and decreasing a sound volume corresponding to the first virtual space while increasing a sound volume corresponding to the second virtual space with the control unit.

39. The non-transitory computer-readable medium according to claim 38, wherein the focus area corresponds to an area in the virtual environment in the immediate foreground of a visual perspective of a character corresponding to a user, and the non-focus area corresponds to an area that is not in the immediate foreground of the visual perspective of the character.

40. The non-transitory computer-readable medium according to claim 38, wherein the method executed by the computer program further comprises:

when a space shift is detected, transferring data corresponding to the focus area of the second space before transferring data corresponding to the non-focus area of the second space with the control unit; and outputting sound with the control unit corresponding to the focus area of the second space before outputting sound corresponding to the non-focus area of the second space.

41. A virtual reality system comprising:

a virtual reality server, comprising:

a first control unit to receive data corresponding to sound sources within a virtual environment and to a character in the virtual environment, the character controllable by a user;

a storage unit to store data corresponding to spaces within the virtual environment including at least a first space and a second space; and a communication unit to communicate with an external device; and a virtual reality apparatus, comprising:

a communication unit to communicate with the communication unit of the virtual reality server;

a sound processing unit to process and produce audio signals corresponding to the spaces in the virtual environment; and a second control unit to receive sound source data from the virtual reality server, to detect a space shift of the character in the virtual environment from the first space to the second space, and to control the sound processing unit, such that when the space shift is detected, the sound processing unit decreases a volume corresponding to the first space while increasing a volume corresponding to the second space.

42. The virtual reality system according to claim 41, wherein the second control unit controls the sound processing unit to output an audio signal corresponding to the non-focus area at a volume less than the focus area.

43. The virtual reality system according to claim 41, wherein when a space shift is detected, the virtual reality server transfers to the virtual reality apparatus sound data corresponding to the focus area of the second space before transferring sound data corresponding to the non-focus area of the second space; and the second control unit controls the sound processing unit to output sound corresponding to the focus area of the second space before outputting sound corresponding to the non-focus area of the second space.

44. The virtual reality system according to claim 41, wherein the sound processing unit comprises:

a focused sound processor to process sound corresponding to the focus area;

a non-focused sound processor to process sound corresponding to the non-focus area;

a sound volume controller to control a volume of sound corresponding to each of the focus area and the non-focus area; and a mixer to combine signals corresponding to volume-adjusted focused and non-focused audio signals and to output a single audio output signal.

45. A method to generate a sensory output in a virtual reality system, the method comprising:

detecting a space shift in a virtual environment from a first virtual space to a second virtual space with a control unit of the virtual reality system;

dividing the second virtual space into a focus area and a non-focus area with the control unit;

generating a sensory output signal with a sensory processing unit of the virtual reality system according to a control signal received from the control unit; and when a space shift is detected by the control unit, directing the sensory processing unit to output a sensory output signal to modify a sensory output corresponding to the first virtual space and to modify a sensory output corresponding to the second virtual space.

46. A method to generate a sensory output in a virtual reality system, the method comprising:

generating a first virtual space having at least a first sensory source with a sensory processing unit of the virtual reality system;

detecting a space shift from the first virtual space to a second virtual space having at least a second sensory source with a control unit of the virtual reality system;

dividing the second virtual space into a focus area and a non-focus area with the control unit; and modifying a magnitude of a sensory output of the first sensory source of the first virtual space and modifying a magnitude of a sensory output of the second sensory source of the second virtual space with the control unit.

* * * * *